July 11, 1944.                J. E. STEWART                    2,353,276
                      MEASURING AND DELIVERING MECHANISM
                         Filed Oct. 24, 1941        3 Sheets-Sheet 1
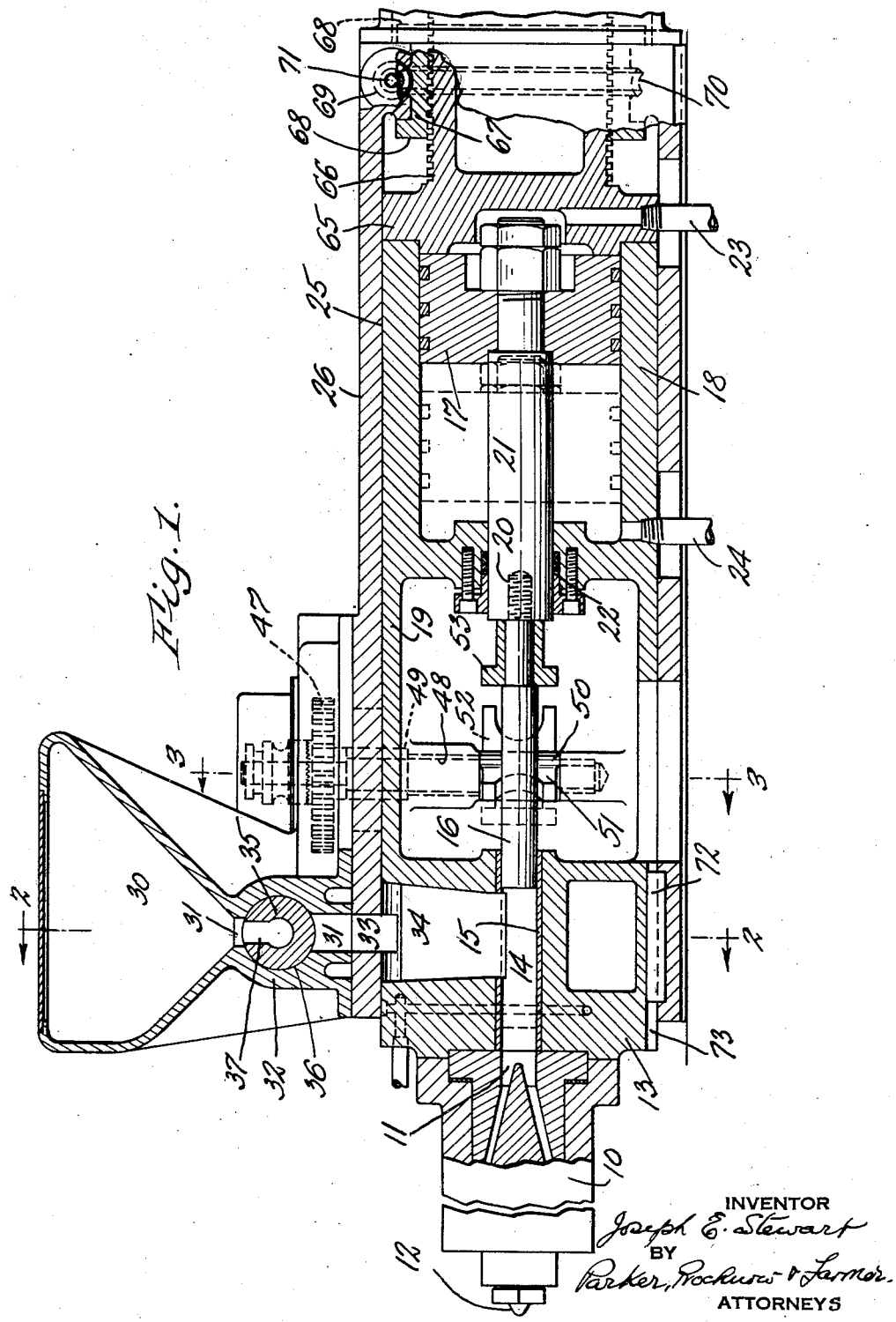
INVENTOR
Joseph E. Stewart
BY
Parker, Prockrow & Farmer
ATTORNEYS July 11, 1944.   J. E. STEWART   2,353,276
MEASURING AND DELIVERING MECHANISM
Filed Oct. 24, 1941   3 Sheets-Sheet 2

INVENTOR
Joseph E. Stewart
BY
Parker, Rockwood & Farmer
ATTORNEYS

July 11, 1944.    J. E. STEWART    2,353,276
MEASURING AND DELIVERING MECHANISM
Filed Oct. 24, 1941    3 Sheets-Sheet 3
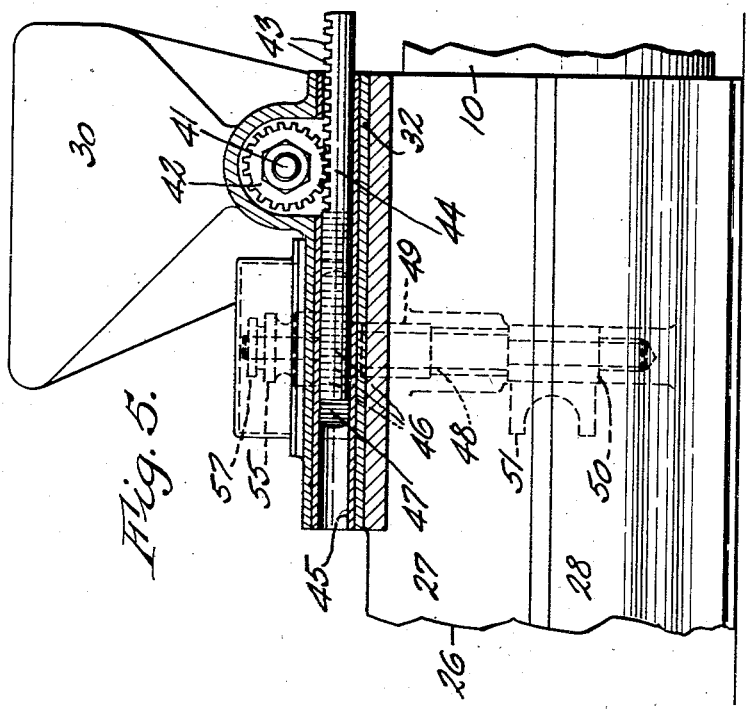
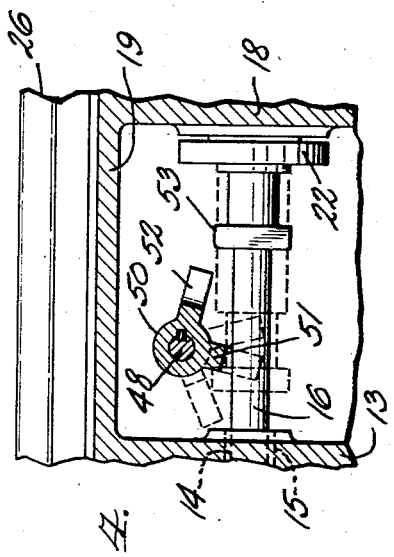
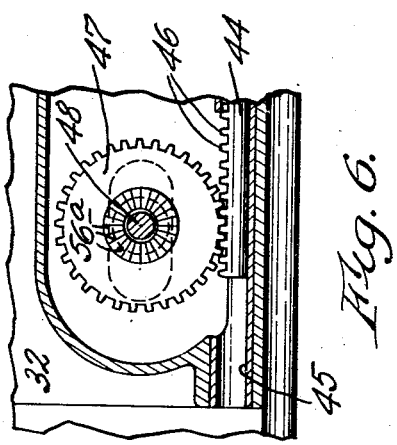
INVENTOR
Joseph E. Stewart
BY
Parker, Rockwow & Farmer.
ATTORNEYS Patented July 11, 1944

2,353,276

UNITED STATES PATENT OFFICE 2,353,276

MEASURING AND DELIVERING MECHANISM

Joseph E. Stewart, Detroit, Mich., assignor to The French Oil Mill Machinery Company, Piqua, Ohio Application October 24, 1941, Serial No. 416,383

7 Claims. (Cl. 18—30)

This invention relates to material measuring and delivering means or mechanisms for injection molding apparatus of that kind in which a comminuted or divided solid material is delivered in successive measured charges to a heating device, which converts the solid material to a fluid or liquid condition, and from which the liquefied material is injected into the mold or molds. Such material measuring and delivering means may comprise a measuring device which delivers measured charges of the divided material into a cylinder or chamber in which an injection plunger is reciprocated by hydraulic or fluid-pressure-actuated means for forcing successive charges into and through the heating device into the mold upon successive forward strokes of the plunger.

One object of the invention is to provide a practical material measuring and delivering means of improved construction, which will be efficient and reliable in operation.

Other objects of the invention are to provide means in which the charge-measuring device or member is actuated by mechanism of simple and practical construction operated by the injection plunger or its actuating device; in which provision is made for readily adjusting or altering the capacity of the measuring device or member so as to vary or regulate, as may be required, the volume or bulk of the measured charges of material delivered to the heating device; and which includes desirable means whereby the measuring and delivering mechanism can be readily adjusted or positioned relatively to the mold, as required, because of possible variations in the location of the mold, or to suit different molds.

Further objects and advantages of the invention will appear from the following specification of the preferred embodiment of the invention, shown in the accompanying drawings, and the novel features of the invention are set forth in the appended claims.

In said drawings:

Fig. 1 is a longitudinal, sectional elevation of a measuring and delivering mechanism embodying the invention and showing the same associated with a device for heating the material.

Figs. 2 and 3 are transverse, sectional elevations thereof on lines 2—2 and 3—3 respectively, Fig. 1.

Fig. 4 is a sectional plan view thereof on line 4—4, Fig. 3.

Fig. 5 is a side elevation, partly in section, on line 5—5, Fig. 3.

Fig. 6 is a sectional plan thereof on line 6—6, Fig. 3.

Figure 3:
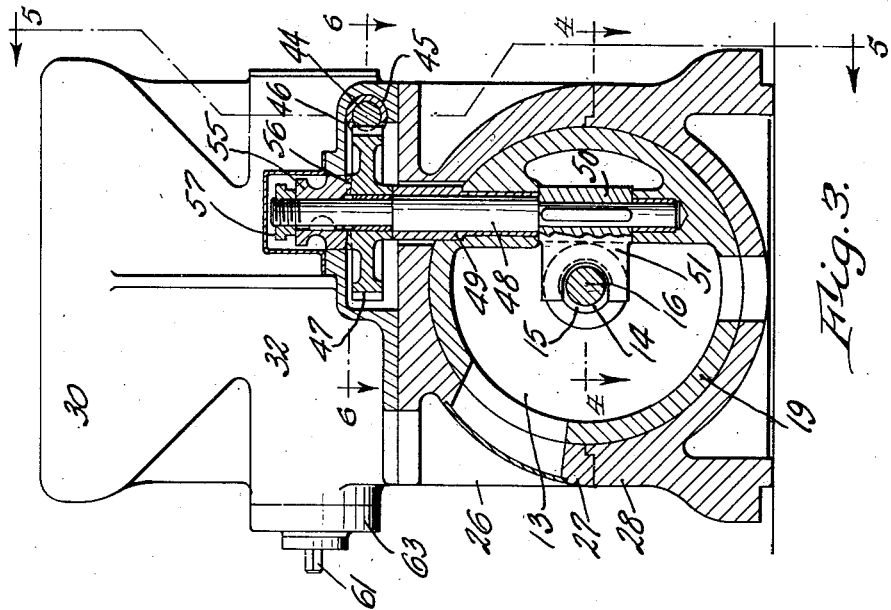
Figure 2:
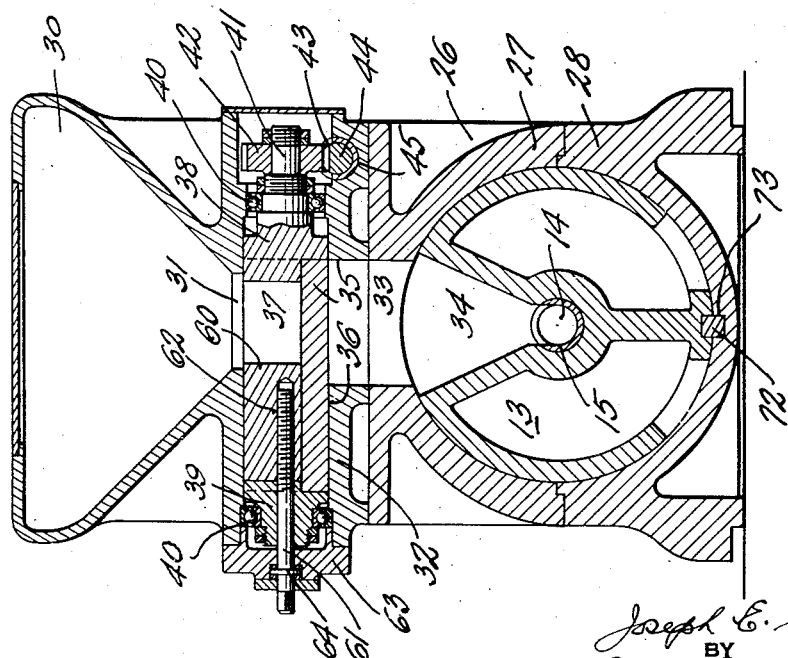

10 represents a heating device which is provided with a passage or passages 11 through which the material is forced by the injection plunger of the delivering mechanism and which is heated in any usual or suitable manner (not shown), so that the material, in the course of its passage through the heating device, is converted from the divided solid condition to a fluid or liquid condition suitable for injection into the mold. As usual, the heating device is provided at one end with a nozzzle 12 which is held or secured tightly against the mold (not shown) and through which the fluid material is injected into the mold.

Bolted or otherwise secured to the receiving end of the heating device 10 in any suitable way, is a body or structure 13 which is provided with a plunger chamber 14, communicating and preferably alined with the receiving end of the passage 11 in the heating device. This plunger chamber, as shown, is cylindrical and formed by a sleeve or bushing 15 secured in a cylindrical hole in the body 13. An injection plunger 16 is arranged to reciprocate in the chamber 14 for forcing successive charges of the divided material from the plunger chamber into the heating device. The injection plunger 16 may be reciprocated by a hydraulically or fluid-pressure-actuated piston 17 arranged to reciprocate in a cylinder 18 which, preferably, is made with an integral hollow shell or extension 19 integral with the body 13 containing the plunger chamber 14. As shown, the injection plunger has a threaded end screwed into a threaded socket 20 in the outer end of the piston rod 21, which may be secured, as by a threaded stem and nuts, to the piston 17, and extends out through a suitable packing box 22 at the end of the cylinder 18 nearest to the plunger chamber 14. The piston 17 may be operated for reciprocating the injection plunger, as by fluid under pressure admitted to and exhausted from the cylinder at opposite sides of the piston through suitable pipes or connections 23 and 24 in any usual or suitable manner.

Preferably, the plunger-operating cylinder 18, together with its hollow extension 19 and body or part 13, is supported so as to be adjustable longitudinally or axially of itself, as hereinafter explained, in a cylindrical chamber 25 in a stationary supporting frame or structure 26 for properly setting or adjusting the injection nozzle of the mechanism in connection with the mold. Frame 26, for the purpose of convenience of manufacture and assembly of the mechanism, may be made in upper and lower sections 27 and 28 divided on the horizontal, diametrical plane of the cylinder and suitably secured together by bolts or other securing means, not shown.

Mounted and suitably secured on top of the stationary frame 26, preferably in a position over the plunger chamber 14, is a feed hopper or receptacle 30 for the divided material. This receptacle, as shown, has walls converging downwardly and a bottom discharge opening or passage 31 extending vertically through a base portion 32 of the receptacle. The discharge passage 31 communicates through a hole 33 in the top of the stationary frame 26 with a passage 34 formed in the body 13 and communicating at its lower end with the injection plunger chamber 14. Said passages or holes 31, 33 and 34 together form a feed passage leading from the feed receptacle for feeding the material from the feed receptacle into the plunger chamber.

In the base 32 of the feed hopper is a measuring device 35 adapted to receive a charge of material from the hopper and, by movement of the measuring device, to deliver the same through the feed passage and into the plunger chamber. Preferably, the measuring device is of cylindrical form and arranged to oscillate in a cylindrical cavity 36 in the hopper base, intersecting the feed passage, and is provided in one side with a pocket 37. In the position of the measuring device shown in Fig. 1, the pocket faces upwardly and is adapted to receive and be filled with material from the hopper, and by turning the measuring device one-half of a revolution, the pocket is inverted and discharges the charge of material into the feed passages 33, 34. The measuring cylinder 35 is preferably provided at its opposite ends with journals 38 and 39 rotatably supported in suitable ball bearings 40 appropriately mounted in the opposite end portions of the cylindrical cavity 36 in the hopper base. As shown, the journals 38 and 39 are formed by end pieces suitably secured to opposite ends of the measuring cylinder 35.

The measuring cylinder or device 35 is oscillated for receiving and discharging the charges of material by mechanism preferably constructed as follows:

Fixed on a reduced extension 41 of the journal 38, at one end of the measuring cylinder, is a pinion 42 which meshes with rack teeth 43 on a rod or bar 44 which is arranged to slide endwise in a sleeve or bushing 45 extending lengthwise or parallel with the axis of the plunger operating cylinder in the hopper base 32. Rack bar 44 is also provided with rack teeth 46 on one side thereof, which mesh with a gear pinion 47 which is secured on a vertical shaft 48 journalled in a suitable bearing sleeve or bushing 49 fixed in a vertical hole in the cylinder extension 19 at one side of the injection plunger. Keyed or fixed in any suitable manner on this shaft is a rocker member 50 which is provided with two arms 51, 52 which project from the body of the rocker at an angle to each other for cooperating with a tappet member 53 secured to and movable with the injection plunger. As shown, this tappet member is in the form of a flanged collar surrounding a reduced outer end portion of the injection plunger and clamped between a shoulder on the plunger and the adjacent end of the piston rod 21, into which the end of the plunger is screwed, the collar thus being stationarily secured in place on the plunger.

In the position of the parts shown in the drawings, in which the pocket of the measuring cylinder faces upwardly so as to be filled by a charge of material from the feed hopper, the rocker arm 51 will occupy a position, as shown in full lines in Fig. 4, with the bifurcated outer end of the arm 51 straddling the injection plunger in advance of and in position to be engaged by the tappet 53. When the injection plunger is moved forwardly to inject material into the heating device, the tappet will strike the arm 51 and swing the same to the dotted line position shown in Fig. 4, thereby rocking shaft 48, and through the rack and pinion mechanism, turning the measuring cylinder 35 for inverting its pocket to discharge the charge therefrom into the feed passage below the measuring cylinder. This movement of the rocker arm 51 by the tappet 53 swings the other arm 52 of the rocker to the dotted line position shown in Fig. 4, in which the bifurcated end of the other rocker arm 52 straddles the the plunger in rear of the tappet 53 so that when the injection plunger is retracted, the tappet will engage the arm 52 and rock the shaft 50 in the opposite direction, for reversely turning the measuring cylinder to replace its pocket in charge-receiving position. In said forward movement of the injection plunger, it will move across and shut off the lower end of the feed passage before the charge drops from the measuring cylinder, and when the plunger is retracted, this charge of material will fall into the plunger chamber in front of the plunger, ready to be pushed forwardly to the heating device at the next advance movement of the plunger. The gear ratio of the pinions 42 and 47 and the relation of the rocker arms 51, 52 to each other and to the tappet 53 are such that the angle through which the rocker and shaft 48 are rocked by the tappet will be sufficient to oscillate the measuring cylinder through approximately 180°, or sufficiently to turn the measuring pocket from an upwardly-facing receiving position to an inverted discharging position, and vice versa.

Preferably, the gear wheel 47 is adapted to be secured in different radial or angular adjustments rotatively about shaft 48 relatively to the angular position of the rocker 50, so that the mechanism can be readily adjusted to insure that oscillations of the measuring cylinder by the rock shaft 48 will be such as to always carry the charge pocket one-half revolution to and from the proper upright receiving position. For this purpose, as shown, the gear wheel 47 is adapted to turn on a reduced upper end portion of the shaft 48 and is secured so as to turn with the shaft by a locking collar 55 which is keyed or splined on the reduced end of the shaft so as to rotate with the shaft, but be movable axially thereon, and the end of the collar adjacent to the gear wheel is provided with radial teeth 56 adapted to interlock with teeth 56a, Fig. 6 on the end face of the gear wheel. The toothed end of the collar is held in engagement with the toothed face of the wheel by a nut 57 which is screwed on the threaded end of the shaft 48 and is adapted to force the collar into holding engagement with the gear wheel. By unscrewing the nut 57, the collar can be disengaged from the gear wheel and the latter adjusted on the shaft, as may be required, and then locked to the shaft by again tightening the nut 57.

In injection molding apparatus of the kind with which the measuring and delivering mechanism of this application is used, it is important that just the correct amount of material to properly fill the molding cavity shall be injected into the mold at each operation of the injection plunger. In order to ensure this result, and also to enable the volume of the charge measured by the measuring device to be regulated as may be desired, the following means are preferably provided for readily altering or varying the size or capacity of the measuring pocket 37 of the measuring cylinder or device 35. An adjustable block 60 is arranged to slide axially of the measuring cylinder in one end of the cylinder pocket 37. An adjusting screw rod 61 having a screw threaded inner end turning in a screw threaded socket 62 in the block 60 passes through a central, axial hole in one journal 39 of the measuring cylinder and out through an axial hole in a cap 63, which is stationarily secured in place, by bolts or other suitable means and closes the adjacent end of the cavity 36 in which the measuring cylinder turns. The screw rod is suitably swivelled at 64 in the cap 63 so as to hold the screw rod from endwise movement when it is turned. The exposed outer end of the screw rod may be made of polygonal form or otherwise suitably fashioned for application of a crank or wrench for turning the screw rod. By turning the screw rod, the slide block 60 may be adjusted inwardly or outwardly in the measuring cylinder, thereby shortening or lengthening the measuring pocket in the cylinder, to regulate, as desired, the volume or bulk of the charge adapted to be received and measured by the measuring cylinder.

As before stated, the operating cylinder 18 for the injection plunger is adapted to be adjusted axially in the stationary frame 26, as may be necessary, to secure the nozzle of the heating device in proper relation to the mold. Preferably, the following adjusting means for the cylinder are provided:

The outer end or head 65 of the cylinder is provided with a screw threaded extension 66. Encircling this extension within the surrounding portion of the frame 26, is an annular nut or sleeve 67. This sleeve has a screw threaded engagement with the extension 66 and is held from endwise movement in the stationary frame, as by annular flanges 68 at opposite ends of the nut straddling and bearing against opposite ends of an inwardly projecting ring or part on the surrounding portion of the frame 26. The threaded nut or sleeve is adapted to be turned in the stationary frame about the extension 66, as by a worm 69 meshing with a worm wheel or ring 70 secured on or formed integrally with the nut. The worm is secured to a shaft 71 suitably journalled in the stationary frame and provided with a projecting end which may be polygonal or otherwise fashioned for the application of a crank or wrench for turning the shaft and worm. The cylinder 18 may be held from turning in the cylindrical chamber 25 of the stationary frame, as by a longitudinally extending key 72 secured to the frame and slidably engaging in a keyway or groove 73 in the extension or body 13 of the cylinder. By turning the worm shaft 71 in one or the other direction, the nut 67 will be rotated and thus the cylinder and connected parts may be adjusted endwise in one direction or the other to properly place the nozzle 12 with respect to the mold.

I claim as my invention:

1. In a material delivering means for injection molding apparatus in which a reciprocating plunger delivers successive charges of material from a plunger chamber to a mold, the improved mechanism for delivering measured charges of material intermittently from a supply source to said plunger chamber comprising a device having a charge measuring pocket, a rock shaft, means by which opposite movements of said injection plunger rock said shaft alternately in opposite directions, a reciprocable bar, a rack and pinion connection between said rock shaft and said bar for reciprocating the bar, and a rack and pinion connection between said bar and said measuring device for moving the measuring device alternately back and forth between positions to receive and deliver the charges of material.

2. In a material measuring and delivering mechanism, a plunger chamber, a plunger which reciprocates in the plunger chamber for delivering successive charges of material therefrom, an oscillatory measuring device having a pocket for delivering measured charges of the material from a supply source to said plunger chamber, a rock shaft which is rocked alternately in opposite directions by opposite movements of said plunger, a reciprocable rack bar, a pinion connected to said rock shaft and engaging rack teeth on said bar for reciprocating the bar, and a pinion connected to said measuring device and engaging rack teeth on said bar whereby said bar oscillates said measuring device.

3. In a material measuring and delivering mechanism, a plunger chamber, a plunger which reciprocates in the plunger chamber for delivering successive charges of material therefrom, a device for delivering measured charges of the material from a supply source to said plunger chamber, a rock shaft, arms extending at an angle to each other from said rock shaft, a tappet movable with said plunger and arranged to engage said arms and rock said shaft alternately in opposite directions by opposite movements of said plunger, rack and pinion connections between said rock shaft and said measuring device for moving the latter alternately back and forth between positions to receive and deliver the charges of material, and means for securing a pinion of said mechanism rotatively in different angular relations on said rock shaft for adjusting the relation of said measuring device to the movements of said plunger.

4. In a material delivering means for injection molding apparatus in which a reciprocating plunger delivers successive charges of material from a plunger chamber to a mold, the improved construction comprising actuating means for said plunger including a fluid pressure cylinder having a fixed end extension in which said plunger chamber is formed, a frame having a chamber in which said cylinder and extension are movably supported for adjustment in the axial direction of said cylinder and plunger chamber, a measuring device supported on said frame and operable for delivering measured charges of the material from a supply source to said plunger chamber, and a conduit formed partly in said frame and partly in said cylinder extension through which the charges pass to the plunger chamber.

5. In a material delivering means for injection molding apparatus in which a reciprocating plunger delivers successive charges of material from a plunger chamber to a mold, the improved construction comprising actuating means for said plunger including a fluid pressure cylinder having a fixed end extension in which said plunger chamber is formed, a frame having a cylindrical chamber in which said cylinder and extension are movably confined for adjustment in the axial direction of said cylinder and plunger chamber, a measuring device supported on said frame and operable for delivering measured charges of the material from a supply source to said plunger chamber, a conduit formed partly in said frame and partly in said cylinder extension through which the charges pass to the plunger chamber, and means for adjusting and holding said cylinder in axially adjusted position in said frame, including a nut rotatable and held from axial movement in the chamber of said frame and having a screw-threaded connection with said cylinder.

6. In a material delivering means for injection molding apparatus in which a reciprocating plunger delivers successive charges of material from a plunger chamber to a mold, the improved mechanism for delivering measured charges of material intermittently from a supply source to said plunger chamber comprising a measuring device, a rock shaft, means by which opposite movements of said injection plunger rock said shaft alternately in opposite directions, a reciprocable bar, a rack and pinion connection between said rock shaft and said bar for reciprocating the bar, and a rack and pinion connection between said bar and said measuring device for moving the measuring device alternately back and forth between positions to receive and deliver the charges of material, one of said pinions being adjustable angularly relatively to the part to which it is secured for adjusting the relation of said measuring device to the movements of said plunger.

7. In a material measuring and delivering mechanism, a plunger chamber, a plunger which reciprocates in the plunger chamber for delivering successive charges of material therefrom, an oscillatory measuring device having a pocket for delivering measured charges of the material from a supply source to said plunger chamber, a rock shaft which is rocked alternately in opposite directions by opposite movements of said plunger, a reciprocable rack bar, a pinion connected to said rock shaft and engaging rack teeth on said bar for reciprocating the bar, and a pinion connected to said measuring device and engaging rack teeth on said bar whereby said bar oscillates said measuring device, one of said pinions being angularly adjustable relatively to the part to which it is secured for adjusting the relation of said measuring device to the movements of said plunger.

JOSEPH E. STEWART.